(12) United States Patent
Tsukada et al.

(10) Patent No.: US 6,494,806 B2
(45) Date of Patent: Dec. 17, 2002

(54) LUBRICATING OIL SUPPLY SYSTEM FOR INFINITELY VARIABLE TRANSMISSION

(75) Inventors: Yoshiaki Tsukada, Saitama (JP); Masahiro Kuroki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 19 days.

(21) Appl. No.: 09/742,114

(22) Filed: Dec. 22, 2000

(65) Prior Publication Data

US 2001/0018382 A1 Aug. 30, 2001

(30) Foreign Application Priority Data

Dec. 24, 1999 (JP) ............................. 11-366932

(51) Int. Cl.[7] ..................... F16H 15/52; F16N 13/20
(52) U.S. Cl. ..................... 476/8; 476/50; 74/606 R; 184/6.12; 184/6.28; 184/31
(58) Field of Search ..................... 476/8, 33, 47, 476/50; 184/6.12, 6.28, 31; 74/606 R (56) References Cited

U.S. PATENT DOCUMENTS

| | | | | |
|---|---|---|---|---|
| 4,834,219 A | * | 5/1989 | Inagaki et al. | 184/31 |
| 5,746,676 A | * | 5/1998 | Kawase et al. | 476/8 |
| 6,155,138 A | * | 12/2000 | Yasunami | 74/606 R |
| 6,203,467 B1 | * | 3/2001 | Yamamoto et al. | 476/8 |

FOREIGN PATENT DOCUMENTS

| | | | |
|---|---|---|---|
| JP | 2-309043 | * | 12/1990 |
| JP | A1179054 | | 3/1999 |
| JP | 11-82660 | * | 3/1999 |
| JP | A11270641 | | 10/1999 |

* cited by examiner

Primary Examiner—David A. Bucci
Assistant Examiner—William C Joyce
(74) Attorney, Agent, or Firm—Birch, Stewart, Kolasch & Birch, LLP (57) ABSTRACT

A lubricating oil supply system for an infinitely variable transmission wherein the infinitely variable transmission has a transmission shaft provided with a lubricating oil path and is rotatably mounted through the wall section of a casing. The infinitely variable transmission is housed in a transmission case partly defined by the wall section. An input rotary member is provided that is relatively unrotatably connected to the transmission shaft on the outside of the transmission case. An oil pump is provided for supplying lubricating oil to the lubricating oil path. The oil pump is located in the casing. In this infinitely variable transmission, the oil passage from the oil pump to the lubricated portion of the infinitely variable transmission is simplified in structure and the oil passage is substantially reduced in length, thereby enabling a decrease in the length of the transmission shaft. The oil pump which is driven by the transmission shaft is located on the wall section.

20 Claims, 5 Drawing Sheets

LUBRICATING OIL SUPPLY SYSTEM FOR INFINITELY VARIABLE TRANSMISSION

BACKGROUND OF THE INVENTION

1. Field of the Invention

This invention relates to improvements in a lubricating oil supply system for an infinitely variable transmission in which an infinitely variable transmission has a transmission shaft rotatably mounted through a wall section attached on the casing, provided with a lubricating oil path, and housed in a transmission case formed in the casing partly defined by the wall section. An input rotary member is relatively unrotatably coupled with the transmission shaft outside of the transmission case. And an oil pump for supplying the lubricating oil to the lubricating oil path is located in the casing.

2. Description of Background Art

This type of lubricating oil supply system has already been known as disclosed in Japanese Patent Laid-Open Nos. Hei 11-79054 and Hei 11-270641 for example.

In the case of the lubricating oil supply system disclosed in Japanese Patent Laid-Open No. Hei 11-79054, the oil pump is driven by a crankshaft which is located apart from the transmission shaft of the infinitely variable transmission. The oil passage from the oil pump to the lubricated area of the infinitely variable transmission, therefore, increases in length. In addition, the oil supply passage becomes complicated in structure.

In the meantime, in the lubricating oil supply system disclosed in Japanese Patent Laid-Open No. Hei 11-270641, an oil pump is mounted on the same axis as the transmission so as to be driven by the transmission shaft, whereby the structure of the oil passage is simplified. However, in the lubricating oil supply system disclosed in Japanese Patent Laid-Open No. Hei 11-270641, the oil pump is located outside of an input gear fastened on the transmission shaft on the outside of the transmission case which is partly defined by the wall section of the casing. The oil passage from the oil pump to the lubricated area of the infinitely variable transmission is shorter than that in the lubricating system disclosed in Japanese Patent Laid-Open No. Hei 11-79054, but is not substantially decreased in length. In addition, the transmission shaft projects largely out of the wall section, resulting in upsizing of the whole body of power train inclusive of the infinitely variable transmission.

SUMMARY AND OBJECTS OF THE INVENTION

In view of the above-described disadvantages inherent to prior art lubricating oil supply systems, the present invention has as its object the provision of a lubricating oil supply system for an infinitely variable transmission which enables simplification of the structure of an oil passage provided between an oil pump and a lubricated area of the infinitely variable transmission.

To accomplish the above-identified object, the present invention includes an infinitely variable transmission that has a transmission shaft rotatably mounted through a wall section attached on the casing, and provided with a lubricating oil path, and housed in a transmission case formed in the casing partly defined by the wall section. An input rotary member is relatively unrotatably coupled with the transmission shaft outside of the transmission case. And an oil pump for supplying the lubricating oil to the lubricating oil path is located in the casing. In this lubricating oil supply system the oil pump driven by the transmission shaft is located on the wall section.

According to the lubricating oil supply system of the above-described constitution, the oil pump is driven by the transmission shaft mounted through the wall section located axially inside of the input rotary member, and therefore it is possible to simplify the structure of the oil passage formed from the oil pump to the lubricating oil path in the transmission shaft. Furthermore, as the oil pump is mounted adjacent to the infinitely variable transmission, the oil passage from the oil pump to the lubricated area of the infinitely variable transmission can be substantially simplified and besides the transmission shaft can be decreased in length by connecting the input rotary member to the end of the transmission shaft.

According to a second aspect of the present invention, the infinitely variable transmission has the transmission shaft, a driving rotary member relatively unrotatably coupled with the transmission shaft, a driven rotary member relatively rotatably supported on the transmission shaft, a carrier movable along the axis of the transmission shaft, a support shaft having its axis along the conic generating line on the center of the axis of the transmission shaft and supported on the carrier, and a shifting rotary member having a conical first friction transfer surface in contact with the driving rotary member and a conical second friction transfer surface in friction contact with the driven rotary member and rotatably supported on the support shaft; the transmission shaft being provided, at an area corresponding to the infinitely variable transmission, with a plurality of oil feed holes communicating with the lubricating oil path at the inner end and open in the outside surface of the transmission shaft at the outer end. It is, therefore, possible to effectively apply the present invention to the infinitely variable transmission which steplessly changes the gear ratio by moving the carrier in the direction of axis of the transmission shaft.

According to a third aspect of the present invention, the oil pump has rotors connected to the transmission shaft in a pump housing formed of the wall section and a cover connected to the wall section; a filter protruding into an oil sump in the casing is mounted on the lower part of the wall section; and an inlet oil path for connection between the filter and the oil pump and a discharge oil path for leading the lubricating oil discharged from the oil pump are provided in the wall section. According to this constitution, it is possible to form an oil passage of compact and simple construction extending from the oil sump to the oil pump. The power transmitting device including the infinitely variable transmission, therefore, will not be upsized by the formation of the oil passage.

Furthermore, according to a fourth aspect of the present invention, there is formed a ring-shaped oil path between the wall section and the transmission shaft, surrounding the transmission shaft and communicating with the discharge oil path; the transmission shaft is provided with a connecting hole between the lubricating oil path in the transmission shaft and the ring-shaped oil path. According to this constitution, it is possible to perform lubrication between the wall section and the transmission shaft while shortening and simplifying the oil passage between the oil pump and the lubricating oil path.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of a lubricating oil supply system according to this invention will be described with reference to one example and the accompanying drawings.

Figure 1:
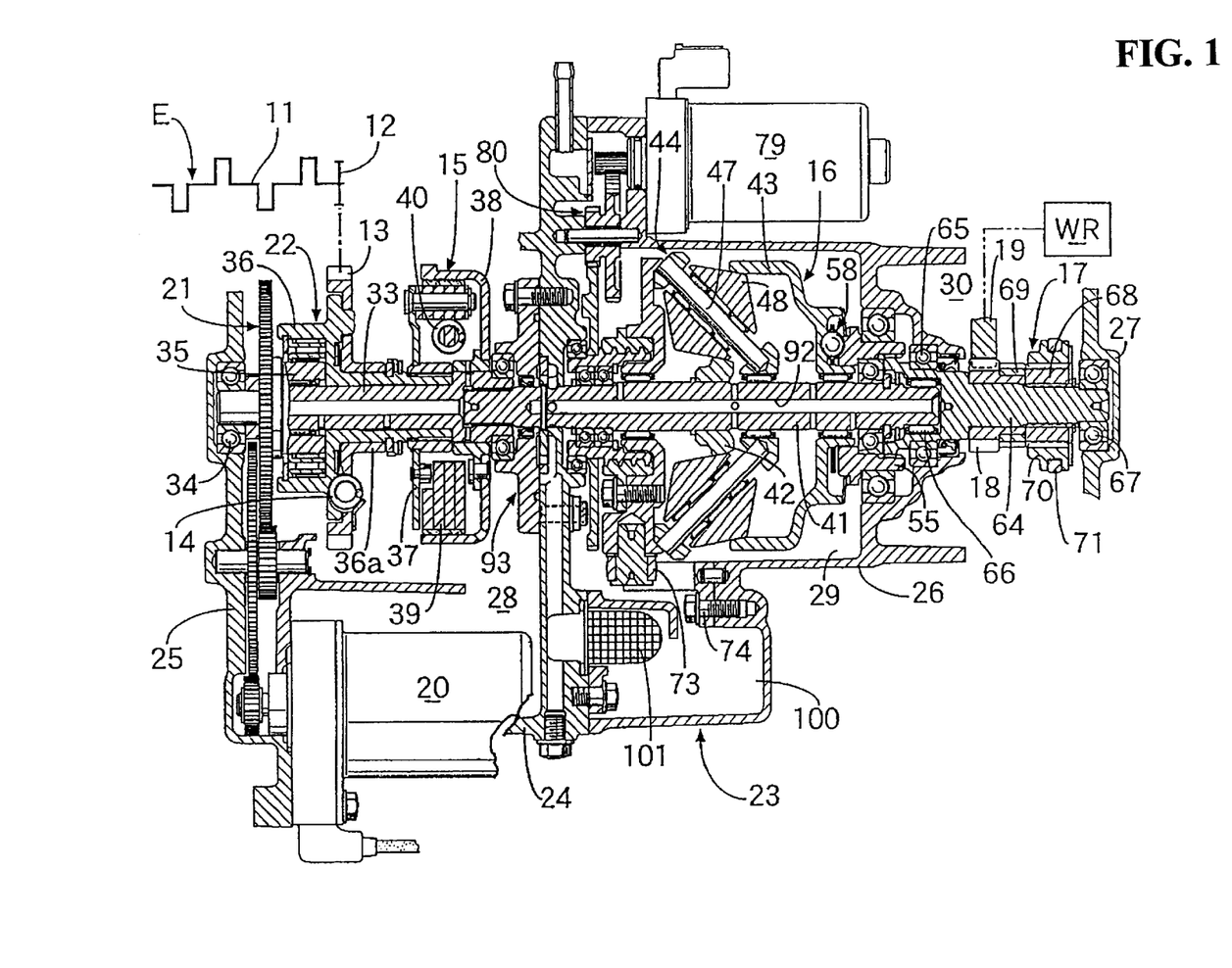
FIG. 1 is a longitudinal sectional view showing a power transmitting structure between an engine and an infinitely variable transmission.

As illustrated in FIG. 1, the output of the engine E mounted on a motor vehicle such as a motorcycle is transmitted from a crankshaft 11 of the engine E to an output gear 18 through a drive gear 12, a driven gear 13, a damper spring 14, a centrifugal clutch 15, an infinitely variable transmission 16, and a neutral clutch 17. A reduction gear 19 connected to a rear wheel WR which is a driving wheel is in mesh with the output gear 18. The output of an engine starting motor 20 can be transmitted to the driven gear 13 through a reduction gear train 21, one-way clutch 22, and the damper spring 14. The one-way clutch 22 allows transmitting the output of the engine starting motor 20 from the reduction gear train 21 to the driven gear 13, that is, to the engine E side through the damper spring 14 at the time of engine E start-up. After the engine E is started up, the power from the engine E side is transmitted to the reduction gear train 21, that is, to the engine starting motor 20 side.

The drive gear 12, driven gear 13, damper spring 14, centrifugal clutch 15, infinitely variable transmission 16, neutral clutch 17, output gear 18, reduction gear 19, reduction gear train 21, and one-way clutch 22 are all housed in a casing 23 which is connected to the engine E crankcase. The casing 23 is comprised of a center casing 24 formed unitarily with a wall section 24a, a first side casing 25 connected to one side of the center casing 24, a second side casing 26 connected to the other side of the center casing 24, and a cover 27 connected to the second side casing 26.

Between the center casing 24 and the first side casing 25 is formed a first operating chamber 28, in which the drive gear 12, driven gear 13, damper spring 14, centrifugal clutch 15, reduction gear train 21, and one-way clutch 22 are housed. The engine starting motor 20 is mounted on the first side casing 25 outside of the casing 23. Between the center casing 24 and the second side casing 26 is formed a transmission case 29 separated by the wall section 24a from the first operating chamber 28. In this transmission case 29 the infinitely variable transmission 16 is housed.

Furthermore, between the second side casing 26 and the cover 27, the neutral clutch, output gear 18, and reduction gear 19 are mounted.

On the first side casing 25, one end of an input shaft 33 as an input rotary member having its axis in parallel with the crankshaft 11 is rotatably supported on a ball bearing 34. The centrifugal clutch 15 and the one-way clutch 22 are mounted on the input shaft 33.

An inner clutch 35 of the one-way clutch 22 is relatively rotatably supported on the input shaft 33, and a cylindrical portion 36a coaxially surrounding the input shaft 33 is formed unitarily with an outer clutch 36 of the one-way clutch 22. The driven gear 13 is relatively rotatably supported on the cylindrical portion 36a, and the driven gear 13 is connected to the outer clutch 36 through the damper spring 14. Therefore, the engine torque is transmitted from the drive gear 12 to the outer clutch 36 through the driven gear 13. Variation in the engine torque is absorbed by the damper spring 14.

A conventional centrifugal clutch 15 comprises an input member 37 splined to the cylindrical portion 36a of the outer clutch 36, a cup-shaped output member 38 connected by press-fitting onto the input shaft 33, a plurality of centrifugal weights 39 movable into friction contact with the inside surface of the output member 38 and swingably supported on the input member 37. Springs 40 exert a spring force to each of the centrifugal weights 39 in a direction in which the centrifugal weights 39 will move away from friction contact with the output member 38. As the power from the engine E is transmitted to the input member 37, the rotational speed of the input member 37 increases over a predetermined value, when the power is transmitted from the input member 37 to the output member 38, that is, the input shaft 33.

Figure 2:
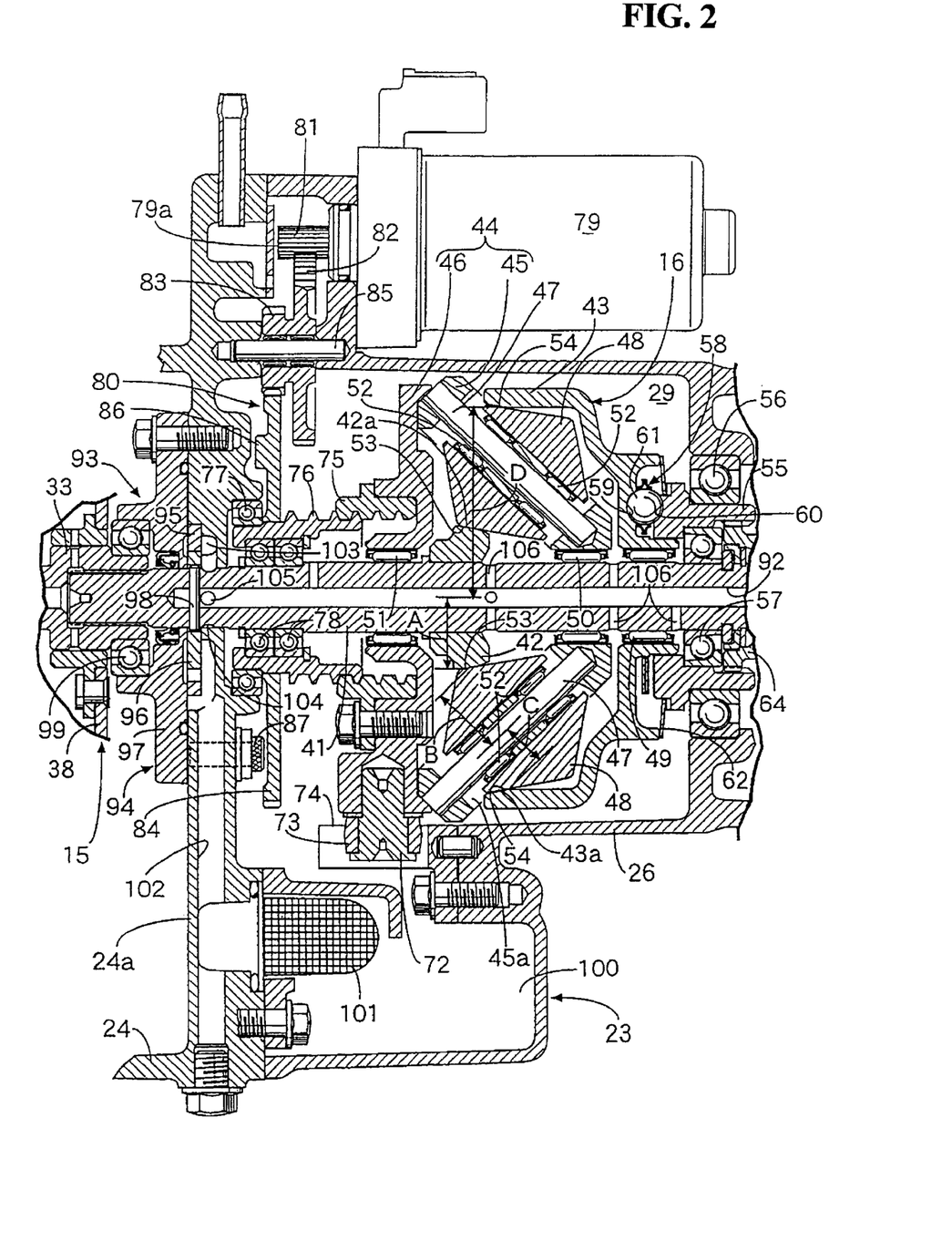
FIG. 2 is an enlarged longitudinal sectional view of the infinitely variable transmission in low gear.
Figure 3:
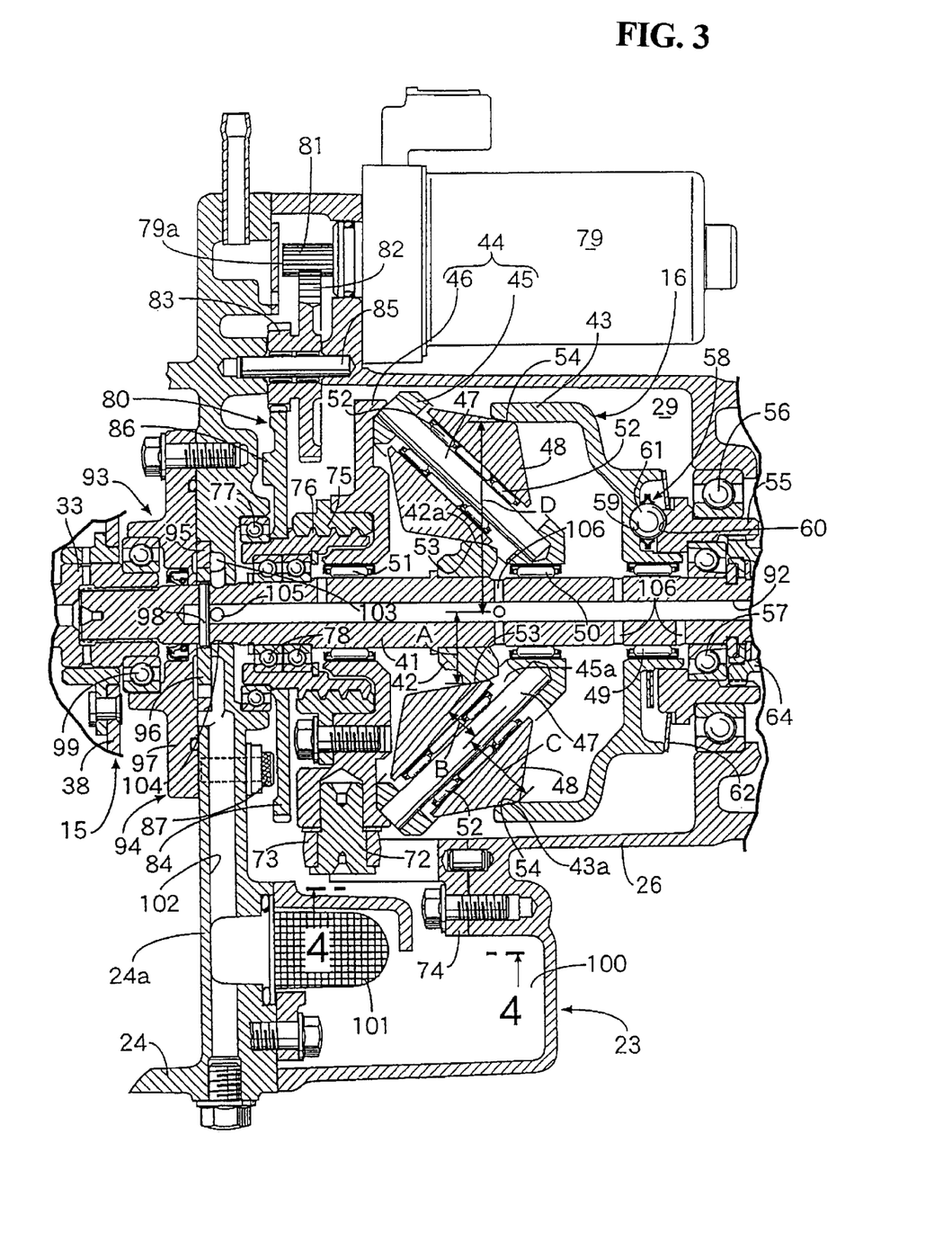
FIG. 3 is an enlarged longitudinal sectional view of the infinitely variable transmission in top gear.

In FIGS. 2 and 3, the infinitely variable transmission 16 has a transmission shaft 41 rotatably supported on the casing 23, coaxially with the input shaft 33, and relatively unrotatably connected to the input shaft 33. A driving rotary member 42 rotates integrally with the transmission shaft 41. A driven rotary member 43 is relatively rotatably supported on the transmission shaft 41. A carrier 44 is movable along the axis of the transmission shaft 41. A plurality of support shafts 47, 47 are supported on the carrier 44 and shifting rotary members 48, 48 are supported by the support shafts 47, 47 respectively.

The driving rotary member 42 is a ring-shaped member having a friction contact surface 42a directed radially outwardly, and connected by press-fitting relatively unrotatably to the transmission shaft 41. The driven rotary member 43 is a cup-shaped member which is open on the driving rotary member 42 side, and relatively rotatably supported on the transmission shaft 41 through a needle bearing 49. The driven rotary member 43 is provided, on the inside surface of the open end, with a friction contact surface 43a which is directed radially inwardly.

The carrier 44 is comprised of an approximately conical first carrier half 45 which is small in diameter on the driven rotary member 43 side and a second carrier half 46 formed in a disc shape and connected to the large-diameter end side of the first carrier half 45, that is, to the opposite side of the driven rotary member 43. The first and second carrier halves 45 and 46 are relatively rotatably and axially slidably supported on the transmission shaft 41 through needle bearings 50 and 51.

The first carrier half 45 is provided with a plurality of window holes 45a equally spaced circumferentially. The plurality of support shafts 47 having the axis along the conical generating line on the center of the axis of the transmission shaft 41 are supported at both ends on the first carrier half 45. On these support shafts 47, the shifting rotary members 48 are rotatably and axially slidably supported each by a pair of needle bearings 52, 52.

The shifting rotary member 48 has a conical first friction transfer surface 53 which is in friction contact with the friction contact surface 42a of the driving rotary member 42, and a conical second friction transfer surface 54 which is in friction contact with the friction contact surface 43a of the driven rotary member 43.

In connection with the driven rotary member 43, a transfer cylinder 55 coaxially surrounding the transmission shaft 41 is located on the opposite side of the carrier 44. Between the outer periphery of the transfer cylinder 55 and the second side casing 25, a ball bearing 56 is interposed. And between the inner periphery of the transfer cylinder 55 and the transmission shaft 41 is interposed an angular contact bearing 57 in a fixed axial position relative to the transmission shaft 41.

Between the driven rotary member 43 and the transfer cylinder 55 is mounted a pressure control cam mechanism 58. In the pressure control cam mechanism 58, balls 61 are inserted between opposite surfaces each formed in one of recesses 59 of the driven rotary member 43 and in the other one of recesses 60 of the transfer cylinder 55. Interposed between the driven rotary member 43 and the transfer cylinder 55 is a disc spring 62 which preloads the driven rotary member 43 to move away from the transfer cylinder 55. A torque, therefore, acts on the driven rotary member 43, so that, when there is produced relative rotation between the driven rotary member 43 and the transfer cylinder 55, the pressure control cam mechanism 58 applies a pressure to move the driven rotary member 43 away from the transfer cylinder 55. This pressure, cooperating with the pressure of the disc spring 62, produces a pressure for pressing the friction contact surface 42a of the driving rotary member 42 against the first friction transfer surface 53, and a pressure for pressing the friction contact surface 43a of the driven rotary member 43 against the second friction transfer surface 54.

As illustrated in FIG. 1, the output gear 18 is relatively rotatably supported on an output shaft 64 which is mounted on the same axis as the transmission shaft 41. The output shaft 64 is rotatably supported on one end side on a ball bearing 65 mounted in the second side casing 26. Between the other end of the transmission shaft 41 and the one end portion of the output shaft 64, a needle bearing 66 is mounted. The output shaft 64 is rotatably supported at the other end on a ball bearing 67 mounted in the cover 27. The output shaft 64 is splined at one end to the transfer cylinder 55. The power transferred from the infinitely variable transmission 16 to the transfer cylinder 55 through the pressure control cam mechanism 59 is transmitted to the output shaft 64 from the transfer cylinder 55.

The neutral clutch 17 includes a gear spline 68 secured on the output shaft 64, a gear spline 69 fixedly attached on the output gear 18 in a position adjacent to the gear spline 68 in the axial direction of the output shaft 64, a shifter 70 movable in the direction of the axis of the output shaft 64 between the position of engagement with the gear spline 68 and the position of engagement with both the gear splines 68 and 69, and a fork 71 rotatably holding the shifter 70. The neutral clutch 17 is operated by the vehicle operator to transmit and interrupt the power between the output shaft 64 and the output gear 18.

Therefore, when pushing to move a motor vehicle such as a motorcycle, no great force overcoming the frictional force of each part of the infinitely variable transmission is needed. Only a slight force is enough to move the motor vehicle.

Figure 4:
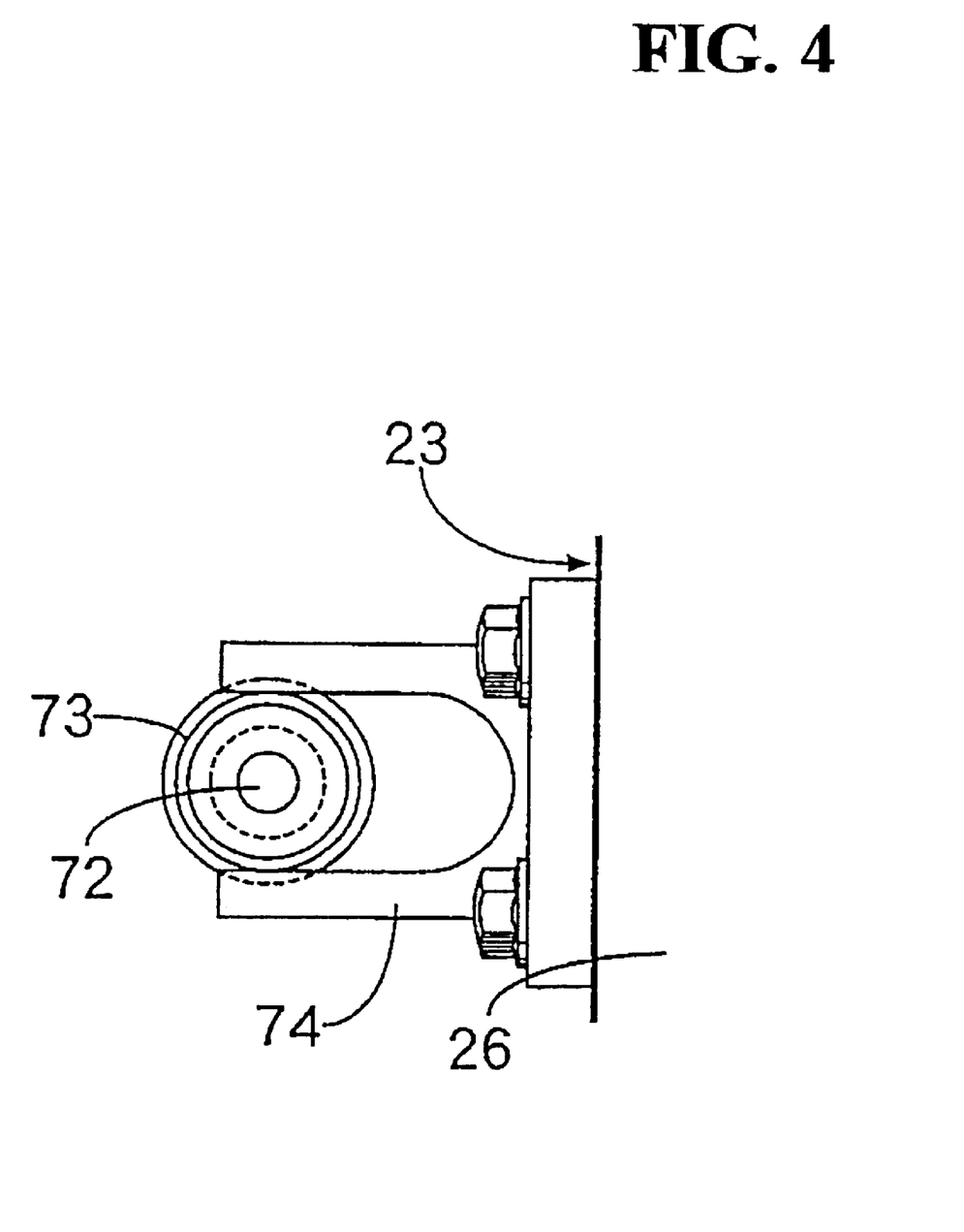
FIG. 4 is a view seen from a line 4—4 of FIG. 3.

Referring to FIGS. 3 and 4, the second carrier half 46 of the carrier 44 in the infinitely variable transmission 16, a shaft 72 having its axis intersecting the axis of the transmission shaft 41 is fixed. A roller 73 is rotatably supported on the shaft 72. In the meantime, on the inner surface of the second side casing 26 in the casing 23, a U-shaped restricting member 74 extending in parallel with the axis of the transmission shaft 41 is fastened. The roller 73 is located to roll in the restricting member 74. The second carrier half 46, that is, the carrier 44, admits the axial movement of the transmission shaft 41 while locking the transmission shaft 41 from rotation about its axis, being engaged with the casing 23.

To the second carrier half 46 of the carrier 44, a driven screw 75 coaxially mounted on the transmission shaft 41 is attached. The driven screw 75 is engaged with the driving screw 76. The driving screw 76 is rotatably supported on the ball bearing 77 mounted in the wall section 24a of the center casing 24 of the casing 23, and furthermore is rotatably supported on a pair of ball bearings 78, 78 on the transmission shaft 41. The ball bearings 78, 78 are interposed in a fixed axial relative position between the driving screw 75 and the transmission shaft 41. That is, the driving screw 76 rotatable around the axis of the transmission shaft 41 is supported on the casing 23, and also is supported on the transmission shaft 41 along the axis of which the driving screw 76 is relatively unmovable.

On the outside surface of the second side casing 26 of the casing 23 is mounted a normally and reversely rotatable electric motor 79 which has an axis in parallel with the transmission shaft 41. A reduction mechanism 80 is located between the electric motor 79 and the driving gear 76.

The reduction mechanism 80 includes a driving gear 81 mounted on the output shaft 79a of the electric motor 79, a first idle gear 82 in mesh with the driving gear 81, a second idle gear 83 formed unitarily with the first idle gear 82, and a driven gear 84 fixedly attached by the driving screw 76 and in mesh with the second idle gear 83. The first and second idle gears 82 and 83 are rotatably supported on an idle shaft 85 having an axis in parallel with the transmission shaft 41. The idle shaft 85 is mounted between the wall section 24a of the center casing 24 and the second side casing 26.

When a turning force from the electric motor 79 is supplied to the driving screw 76 through the reduction mechanism 80, the carrier 44 fixed on the driven screw 75 which is in mesh with the driving screw 76 is engaged with the casing 23, in which the axial movement of the transmission shaft 41 is admitted and the rotation of the carrier 44 around the axis of the transmission shaft 41 is not permitted. The carrier 44, therefore, moves in the axial direction of the transmission shaft 41.

In such an infinitely variable transmission 16, let A be a distance from contact points on the friction contact surface 42a of the driving rotary member 42 and the first friction transfer surface 53 to the axis of the transmission shaft 41, B be a distance from contact points on the friction contact surface 42a of the driving rotary member 42 and the first friction transfer surface 53 to the axis of the support shaft 47, C be a distance from contact points on the friction contact surface 43a of the driven rotary member 43 and the second friction transfer surface 54 to the axis of the support shaft 47, D be a distance from contact points on the friction contact surface 43a of the driven rotary member 43 and the second friction transfer surface 54 to the axis of the transmission shaft 41, NI be the number of revolutions of the driving rotary member 42, NO be the number of revolutions of the driven rotary member 43, and R-NI/NO be the gear ratio R, and the following equation will be given.

$$R=NI/NO=(B/A)\times(D/C)$$

When the driving screw 76 is turned by the electric motor 79 and the reduction mechanism 80 to move the driven screw 75 and the carrier 44 toward the driven rotary member 43 as shown in FIG. 2. In this state in FIG. 2 in which the distance B increases, while the distance C decreases, the distances A and D remain fixed, the gear ratio R increases, the distance B increases to a maximum, and the distance C decreases to a minimum, thereby shifting the transmission into low gear. In the meantime, when the driven screw 75 and the carrier 44 are moved away from the driven rotary member 43 as shown in FIG. 3, the distance B decreases while the distance C increases. Also since the distances A and D remain fixed, the gear ratio R lowers, the distance B decreases to a minimum and the distance C increases to a maximum, thus shifting the transmission into top gear as shown in FIG. 3.

The driven gear 84 in the reduction mechanism 80 has a unitarily formed restricting projection 86 projecting toward the wall section 24a side of the center casing 24. On the wall section 24a is fixed a stopper 87 which can contact and engage with the restricting projection 86. When the restricting projection 86 contacts into engagement with the stopper 87, the rotational angle of the driving screw 76, that is, the axial travel of the carrier 44 is restricted.

Figure 5:
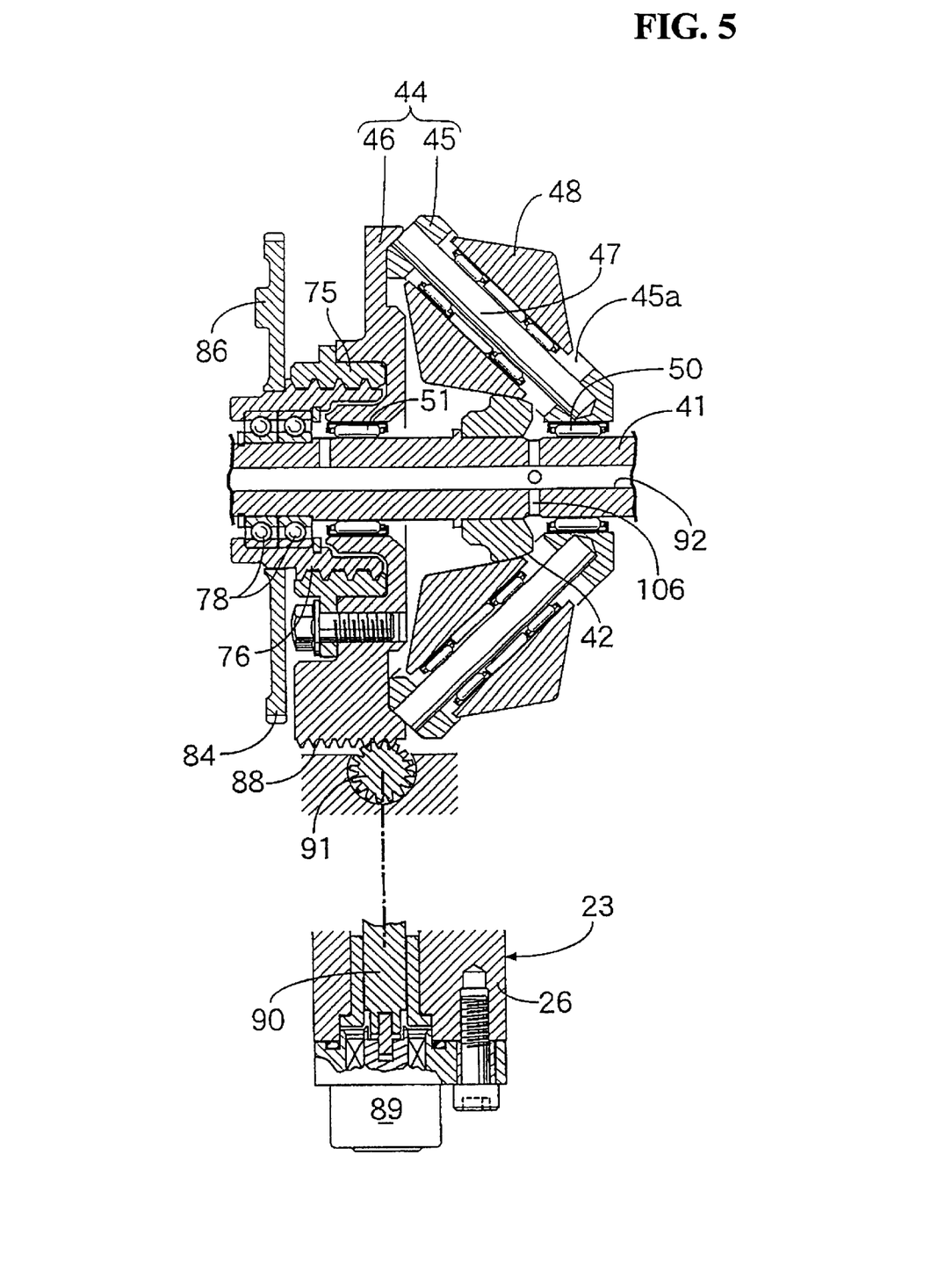
FIG. 5 is a sectional view showing the structure of a connection between a carrier and a potentiometer.

In FIG. 5, a rack 88 extends in parallel with the axis of the transmission shaft 41 and is provided on the outer periphery of the second carrier half 46 of the carrier 44. A connecting shaft 90 having on one end a pinion 91 in mesh with the rack 88 is rotatably supported on the second side casing 26 of the casing 23. On the outside surface of the second side casing 26 a potentiometer 89 is mounted. The connecting shaft 90 is connected at the other end to the potentiometer 89. According to this configuration, therefore, the position of movement of the rack 88, that is, the carrier 44, along the axis of the transmission shaft 41 is detected by the potentiometer 89. The gear ratio of the infinitely variable transmission 16 is determined by the position of movement of the carrier 44, and therefore is detected by the potentiometer 89.

The transmission shaft 41 of the infinitely variable transmission 16 is provided with a lubricating oil path 92, which is formed coaxially and is closed at one end and open at the other end. An oil pump 93 for supplying lubricating oil to the lubricating oil path 92 is mounted on the wall section 24a of the center casing 24 and is driven by the transmission shaft 41.

The oil pump 93 is a trochoid pump, which comprises a pump housing 94, an outer rotor 95 rotatably mounted in the pump housing 94, and an inner rotor 96 mounted in the pump housing, rotatably in mesh with the inner periphery of the outer rotor 95.

The pump housing 94 comprises the wall section 24, and a cover 97 tightened to the wall section 24a from the first operating chamber 28 side. The transmission shaft 41 of the infinitely variable transmission 16 is rotatably inserted liquid-tight on one end side through the cover 97. One end of the transmission shaft 41 is relatively unrotatably coupled with the input shaft 33. In the pump housing 94, the transmission shaft 41 is connected with the inner rotor 96 through a pin 98. Between the cover 97 and the input shaft 33 is mounted a ball bearing 99.

An oil sump 100 is formed in the lower part of the transmission case 29. An oil filter 101 located in the oil sump 100 is attached on the lower part of the wall section 24a in the center casing 24. An inlet oil path 102 for connection between the oil filter 101 and the oil pump 93 and a discharge oil path 103 for leading the lubricating oil discharged from the oil pump 93 are formed in the wall section 24a. A ring-shaped oil path 104 surrounding the transmission shaft 41 and communicating to the discharge oil path 103 is provided between the wall section 24a and the transmission shaft 41, by forming a ring-shaped groove in the outside surface of the transmission shaft 41. The transmission shaft 41 has a communicating hole 105 between the lubricating oil path 92 and the ring-shaped oil path 104 in the transmission shaft 41. Furthermore, in a portion of the transmission shaft 41 corresponding to the infinitely variable transmission 16, there are provided a plurality of oil feed holes 106, 106 which are connected in the inner end with the lubrication oil path 92 and are open at the outer end to the outside surface of the transmission shaft 41.

Next, the operation of the present embodiment of the lubricating oil supply system will be explained. In the infinitely variable transmission 16, the carrier 44 is engaged with the second side casing 26 of the casing 23, being allowed to move in the axial direction of the transmission shaft 41 but not to rotate about the axis of the transmission shaft 41. The driving screw 76 is supported on the side casing 26 in such a manner as to rotate around the axis of the transmission shaft 41, and is engaged with the driven gear 75 secured on the second carrier half 47 in the carrier 44. Between the electric motor 79 mounted in the second side casing 26 of the casing 23 and the driving screw 76, the reduction mechanism 80 is located. Therefore, as the driving screw 76 turns according to the operation of the electric motor 79, the driven screw 75, that is, the carrier 44, moves along the axis of the transmission shaft 41, thereby freely enabling the changing of the gear ratio of the infinitely variable transmission 16 notwithstanding the operation of the motor vehicle.

A rotational reaction force working from the shifting rotary members 48 to the carrier 44 through the support shafts 47 is received by the casing 23, and therefore will not be a burden to the electric motor 79. Therefore, the electric motor 79 is required only to produce power to move the carrier 44 along the axis of the transmission shaft 41. It is, therefore, possible to downsize the electric motor 79. Besides since it is not needed to set a large reduction ratio of the reduction mechanism 80, the infinitely variable transmission 16 will not shift down.

The driving screw 76 is supported on a pair of ball bearings 78, 78 on the transmission shaft 41, being relatively unmovable along the axis of the transmission shaft 41. Therefore, since the carrier 44 is pulled to the left side in FIGS. 2 and 3 during an upshift to a higher gear, the driving screw 76 is loaded toward the right in FIGS. 2 and 3. The load is transmitted to the transmission shaft 41 through the ball bearings 78, 78. In the meantime, the leftward load acting on the carrier 44 is transmitted from the carrier 44 to the transmission shaft 41 through the support shafts 47, shifting rotary members 48, and driving rotary member 42, becoming equal to the load from the ball bearings 78, 78. During a downshift to a lower gear, the carrier 44 is pushed in a direction shown in FIGS. 2 and 3, applying load to the driving screw 76 leftward in FIGS. 2 and 3. The load also is transmitted to the transmission shaft 41 through the ball bearings 78, 78. In the meantime, the rightward load acting on the carrier 44 is transferred from the carrier 44 to the transmission shaft 41 through the support shafts 47, shifting rotary members 48, driven rotary member 43, and angular contact bearing 57, thus becoming equal to the load from the ball bearings 78, 78.

When the carrier 44 is moved in the axial direction of the transmission shaft 41, the load is transmitted from the driving rotary member 42 or the driven rotary member 43 to the transmission shaft 41. Accordingly, in order to counterbalance the load, load is transmitted from the driving screw 46 to the transmission shaft 41, enabling improvements in gear ratio setting accuracy and also in assembling efficiency of the infinitely variable transmission 16. Furthermore, it is possible to avoid a great load on the casing 23, thereby enabling a weight reduction of the casing 23.

The rack 88 is formed on an outside surface of the second carrier half 46 of the carrier 44. The potentiometer 89 which detects the position of movement of the carrier 44 along the axis of the transmission shaft 41 is connected to the rack 88 and is attached on the second side casing 26 of the casing 23. Therefore, it is possible to detect the position of the carrier 44 along the axis of the transmission shaft 41, that is, the gear ratio of the infinitely variable transmission 16 with a high accuracy.

The oil pump 93 is driven by the transmission shaft 41 to supply the lubricating oil to the lubricating oil path 92 and is formed in the transmission shaft 41 which is located on the wall section 24a provided in the center casing 24, defining a part of the transmission case 29 in which the infinitely variable transmission 16 is housed. That is, the oil pump 93 is located on the wall section 24a placed axially inward from the input shaft 33 which is relatively unrotatably connected to the transmission shaft 41, and is driven by the transmission shaft 41. It is, therefore, possible to simplify the structure of the oil passage from the oil pump 93 to the lubricating oil path 92. Furthermore, since the oil pump 93 is located adjacent to the infinitely variable transmission 16, the oil passage from the oil pump 93 to the lubricated portion of the infinitely variable transmission 16 can be fully simplified. In addition, the transmission shaft 41 can be reduced in length by connecting the input shaft 33 to the end of the transmission shaft 41.

The transmission shaft 41 is provided, in a portion corresponding to the infinitely variable transmission 16, with a plurality of oil feed holes 106, 106 which communicate at the inner end with the lubricating oil path 92 and are open at the outer end to the outside surface of the transmission shaft 41. It is possible to effectively lubricate the infinitely variable transmission 16 which steplessly changes the gear ratio, by moving the carrier 44 in the axial direction of the transmission shaft 41.

Furthermore, the oil pump 93 is a trochoid pump with the outer and inner rotors 95 and 96 connected to the transmission shaft 41 housed in the cover 97 connected to the wall section 24a of the casing 23 and in the pump housing 94 formed of the wall section 24a. An oil filter 101 protruding to the oil sump 100 in the casing 23 is attached on the lower part of the wall section 24a; and an inlet oil path 102 connecting the oil filter 101 to the oil pump 93 and the discharge oil path 103 leading the lubricating oil discharged from the oil pump 93 are provided in the wall section 24a. The oil passage formed from the oil sump 100 to the oil lubricating path 92 via the oil pump 93 can be made compact and simple in structure. Consequently there is no necessity for upsizing the power transmitting system including the infinitely variable transmission 16 for formation of the oil passage.

Furthermore, between the wall section 24a and the transmission shaft 41 there is formed a ring-shaped oil path 104 surrounding the transmission shaft 41 and connected to the discharge oil path 103. Because the transmission shaft 41 is provided with a communicating hole 105 connecting the lubricating oil path 92 to the ring-shaped oil path 104, the oil passage between the oil pump 93 and the lubricating oil path 92 can be decreased in length and simplified, enabling lubrication between the wall section 24a and the transmission shaft 41.

While preferred embodiments of this invention are shown and explained hereinabove, it will be understood that this invention is not to be limited thereto since many modifications and changes may be made therein within the true spirit and scope of this invention.

According to the first aspect, as hereinabove described, the oil pump is mounted on the wall section located axially inside of the input rotary member and driven by the transmission shaft; therefore it is possible to simplify the structure of the oil passage from the oil pump to the lubricating oil path in the transmission shaft, and accordingly it becomes possible to substantially simplify the oil passage from the oil pump to the lubricated portion of the infinitely variable transmission and furthermore to decrease the length of the transmission shaft by connecting the input rotary member to the end of the transmission shaft.

Further according to the second aspect, it is possible to effectively apply the present invention to infinitely variable transmissions in which the gear ratio is steplessly changed by moving the carrier in the axial direction of the transmission shaft.

Further according to the third aspect, it is possible to form a compact, simplestructure oil passage from the oil sump to the lubricating oil path through the oil pump. It, therefore, is unnecessary to upside the power transmitting system including the infinitely variable transmission in which the oil passage is formed.

Further according to the fourth aspect, it is possible to ensure lubrication between the wall section and the transmission shaft while shortening and simplifying he oil passage between the oil pump and the lubricating oil path.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubricating oil supply system for an infinitely variable transmission comprising:

an infinitely variable transmission having a transmission shaft rotatably mounted through a wall section located in a casing;

a lubricating oil path provided in the transmission shaft, said infinitely variable transmission being housed in a transmission case formed in said casing partly defined by said wall section;

an input rotary member being disposed on an outside surface of said transmission case, said input rotary member being relatively unrotatably coupled with said transmission shaft outside of said transmission case; and an oil pump for supplying lubricating oil to said lubricating oil path, said oil pump being located in said casing and said oil pump being mounted on and driven by said transmission shaft being mounted through said wall section, wherein a bearing member mounted on a cover of said oil pump is fitted around said input rotary member.

2. The lubricating oil supply system for an infinitely variable transmission according to claim 1, wherein said infinitely variable transmission includes said transmission shaft, a driving rotary member relatively unrotatably coupled with said transmission shaft, a driven rotary member relatively rotatably supported on said transmission shaft, a carrier movable along the axis of said transmission shaft, a plurality of support shafts, axes of which are arranged in a conic shape around the axis of said transmission shaft and supported on said carrier, and a shifting rotary member having a conical first friction transfer surface in contact with said driving rotary member and a conical second friction transfer surface in friction contact with said driven rotary member and rotatably supported on said support shaft; said transmission shaft being provided, at an area corresponding to said infinitely variable transmission, with a plurality of oil feed holes communicating with said lubricating oil path at an inner end and open in the outside surface of said transmission shaft at the outer end.

3. The lubricating oil supply system for an infinitely variable transmission according to claim 2, wherein said oil pump includes rotors connected to said transmission shaft in a pump housing formed by a cover connected to said wall section and the wall section; a filter protruding into an oil sump in said casing, said oil sump being mounted on the lower part of said wall section; and an inlet oil path for connection between said filter and said oil pump and a discharge oil path for leading the lubricating oil discharged from said oil pump being provided in the wall section.

4. The lubricating oil supply system for an infinitely variable transmission according to claim 3, and further including a ring-shaped oil path surrounding said transmission shaft and communicating with said discharge oil path, said ring-shaped oil path being formed between said wall section and said transmission shaft and said transmission shaft being provided with a communicating hole for connection between said lubricating oil path and said ring-shaped oil path in said transmission shaft.

5. The lubricating oil supply system for an infinitely variable transmission according to claim 2, wherein a driven screw is secured to said carrier for selectively imparting linear motion to said carrier.

6. The lubricating oil supply system for an infinitely variable transmission according to claim 5, wherein a driving screw imparts rotation to said driven screw for imparting linear motion to said carrier, said driving screw being mounted on bearings on said transmission shaft.

7. The lubricating oil supply system for an infinitely variable transmission according to claim 1, wherein said oil pump includes rotors connected to said transmission shaft in a pump housing formed by a cover connected to said wall section and the wall section; a filter protruding into an oil sump in said casing, said oil sump being mounted on the lower part of said wall section; and an inlet oil path for connection between said filter and said oil pump and a discharge oil path for leading the lubricating oil discharged from said oil pump being provided in the wall section.

8. The lubricating oil supply system for an infinitely variable transmission according to claim 7, and further including a ring-shaped oil path surrounding said transmission shaft and communicating with said discharge oil path, said ring-shaped oil path being formed between said wall section and said transmission shaft and said transmission shaft being provided with a communicating hole for connection between said lubricating oil path and said ring-shaped oil path in said transmission shaft.

9. The lubricating oil supply system for an infinitely variable transmission according to claim 1, wherein said oil pump is a trochoid pump including a pump housing, and outer rotor rotatably mounted in the pump housing and an inner rotor mounted in the pump housing and being in rotatable mesh with an inner periphery of the outer rotor.

10. The lubricating oil supply system for an infinitely variable transmission according to claim 9, wherein said pump housing includes the wall section and said cover for forming an operating chamber therebetween.

11. A lubricating oil supply system for an infinitely variable transmission comprising:
   an infinitely variable transmission;
   a transmission casing including wall sections for supporting the infinitely variable transmission;
   a transmission shaft rotatably mounted through a wall section located in the casing;
   a lubricating oil path provided in the transmission shaft;
   an input rotary member being disposed on an outside surface of said transmission case, said input rotary member being relatively unrotatably coupled with said transmission shaft outside of said transmission case; and
   an oil pump for supplying lubricating oil to said lubricating oil path, said oil pump being located in said transmission casing and said oil pump being mounted on and driven by said transmission shaft, wherein a bearing member mounted on a cover of said oil pump is fitted around said input rotary member.

12. The lubricating oil supply system for an infinitely variable transmission according to claim 11, wherein said infinitely variable transmission includes said transmission shaft, a driving rotary member relatively unrotatably coupled with said transmission shaft, a driven rotary member relatively rotatably supported on said transmission shaft, a carrier movable along the axis of said transmission shaft, a plurality of support shafts, axes of which are arranged in a conic shape around the axis of said transmission shaft and supported on said carrier, and a shifting rotary member having a conical first friction transfer surface in contact with said driving rotary member and a conical second friction transfer surface in friction contact with said driven rotary member and rotatably supported on said support shaft; said transmission shaft being provided, at an area corresponding to said infinitely variable transmission, with a plurality of oil feed holes communicating with said lubricating oil path at an inner end and open in the outside surface of said transmission shaft at the outer end.

13. The lubricating oil supply system for an infinitely variable transmission according to claim 12, wherein said oil pump includes rotors connected to said transmission shaft in a pump housing formed by a cover connected to said wall section and the wall section; a filter protruding into an oil sump in said casing, said oil sump being mounted on the lower part of said wall section; and an inlet oil path for connection between said filter and said oil pump and a discharge oil path for leading the lubricating oil discharged from said oil pump being provided in the wall section.

14. The lubricating oil supply system for an infinitely variable transmission according to claim 13, and further including a ring-shaped oil path surrounding said transmission shaft and communicating with said discharge oil path, said ring-shaped oil path being formed between said wall section and said transmission shaft and said transmission shaft being provided with a communicating hole for connection between said lubricating oil path and said ring-shaped oil path in said transmission shaft.

15. The lubricating oil supply system for an infinitely variable transmission according to claim 12, wherein a driven screw is secured to said carrier for selectively imparting linear motion to said carrier.

16. The lubricating oil supply system for an infinitely variable transmission according to claim 15, wherein a driving screw imparts rotation to said driven screw for imparting linear motion to said carrier, said driving screw being mounted on bearings on said transmission shaft.

17. The lubricating oil supply system for an infinitely variable transmission according to claim 11, wherein said oil pump includes rotors connected to said transmission shaft in a pump housing formed by a cover connected to said wall section and the wall section; a filter protruding into an oil sump in said casing, said oil sump being mounted on the lower part of said wall section; and an inlet oil path for connection between said filter and said oil pump and a discharge oil path for leading the lubricating oil discharged from said oil pump being provided in the wall section.

18. The lubricating oil supply system for an infinitely variable transmission according to claim 17, and further including a ring-shaped oil path surrounding said transmission shaft and communicating with said discharge oil path, said ring-shaped oil path being formed between said wall section and said transmission shaft and said transmission shaft being provided with a communicating hole for connection between said lubricating oil path and said ring-shaped oil path in said transmission shaft.

19. The lubricating oil supply system for an infinitely variable transmission according to claim 11, wherein said oil pump is a trochoid pump including a pump housing, and outer rotor rotatably mounted in the pump housing and an inner rotor mounted in the pump housing and being in rotatable mesh with an inner periphery of the outer rotor.

20. The lubricating oil supply system for an infinitely variable transmission according to claim 19, wherein said pump housing includes the wall section and a cover for forming an operating chamber therebetween.

* * * * *